Patented Nov. 4, 1952

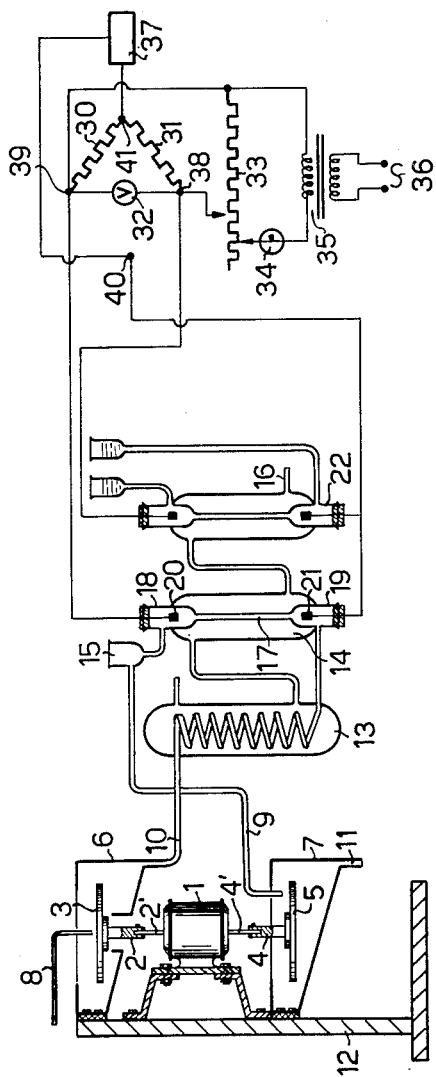

2,616,950

UNITED STATES PATENT OFFICE 2,616,950

APPARATUS FOR CONTINUOUSLY DETERMINING THE ELECTRICAL CONDUCTIVITY OF A LIQUID

Johannes Terpstra, Geleen, Netherlands, assignor to De Directie van de Staatsmijnen in Limburg, Heerlen, Netherlands Application October 1, 1951, Serial No. 249,055
In the Netherlands October 4, 1950

4 Claims. (Cl. 175—183)

The present invention relates to an apparatus for continuously determining the electrical conductivity of a liquid.

As is well-known the conductivity of a liquid is frequently availed of in chemical engineering for controlling or regulating a chemical or physical process, since, the conductivity is a measure of the number of ions present in a solution.

The conductivity is determined by measuring the resistance between two electrodes that are immersed in the liquid. Apart from the properties of the liquid, the measured resistance is also dependent on many other factors, such as the temperature, the character of the electrodes and the shape and dimensions of the vessel in which the measurement is performed.

This is the reason why the practical application of the determination of conductivity is usually restricted to making a comparison between the resistance of the liquid and that of a standard liquid, in which procedure, the two liquids are brought into two substantially uniform measuring cells which are maintained at the same temperature. The standard used in this case is a liquid which corresponds as much as possible with the average composition of the liquid to be measured.

For the continuous determination of the conductivity, it is required that the liquid be automatically passed through the measuring cell, taking care that no undesired electrical contacts will be formed by the liquid current, since in practice, the measurements have been found to be strongly affected by the undesirable electrical contacts.

This can be realized by introducing the liquid dropwise into the measuring cell and by withdrawing it in a similar manner. Although according to theory either a dropwise introduction or a dropwise discharge would be sufficient, it is advisable in practice to preclude any electric contact of the electrodes that may be established through the entering and outgoing currents of the liquid to be measured.

As a result of said dropwise introduction and/or discharge, the rate of flow of the liquid in the measuring cell is small. When the liquid is not homogeneous, that is to say when the liquid contains dispersed or emulsified particles, it is possible for the particles to deposit in the measuring cell with the result that the properties of the measuring cell are altered and the values measured become unreliable.

As an instance of this possibility, mention can be made of the continuous determination of the composition of a fertilizer, such as nitro limestone which consists of a mixture of ammonium nitrate and marl. In the determination of conductivity, given amounts of the fertilizer are added, either continuously or semi-continuously, to given amounts of water. In the resulting liquid, consisting of an ammonium nitrate solution in which marl is present in a dispersed state, the ammonium nitrate content is determined by measuring the conductivity. It has appeared that when the liquid is supplied dropwise, the marl particles deposit in the measuring cell.

In order to obviate this drawback, the liquid to be measured may in advance be freed of the nondissolved impurities, for instance in a centrifuge or in a cyclone clarifier. This leads to complicated arrangements.

Therefore, the object of the invention is to provide an improved apparatus for continuously determining the conductivity of a liquid by which the aforementioned difficulties of depositing of suspended particles in the measuring cell are entirely obviated.

To attain this object, according to the invention, an apparatus for continuously determining the conductivity of a liquid has been developed, comprising means for maintaining a sufficiently large current of liquid through the measuring cell in order to prevent the suspended particles to deposit in this cell, in such a way that no electrical contacts can be formed through the body of the liquid.

This is attained by making use of an element which is adapted to rapidly rotate on a shaft, such as a flat disc mounted on a motor shaft. Liquid fed on to the disc is flung outwards by the occurring centrifugal forces. When the liquid current is not too large the liquid is centrifuged in the form of drops. By collecting said drops in a drum surrounding the rotary member, a fairly large liquid current can be maintained without incurring the risk of electric contacts being established by the liquid. This measure for interrupting the liquid current without reducing the rate of flow may be applied either to the entering or to the outgoing current. It is preferred, however, to apply it on both sides in order to avoid irregular electric contacts.

An embodiment of the invention is described hereafter and schematically illustrated in the drawing, but it is to be understood that it is illustrative only and not limiting because obviously certain changes and modifications are possible as long as they fall within the metes and bounds as defined in the appended claims or the equivalents of the latter's requirements.

In the drawing 1 is an electrical motor mounted on a base 12 and having a vertical shaft. The shafts 2 and 4, made of insulating material, are mounted on both sides of said motor shaft. These shafts carry the flat discs 3 and 5 surrounded by the receivers 6 and 7 which are likewise mounted on the base 12. The receiver 6, and also 7 if desired, is electrically insulated.

Since the disc 3 and the receiver 7 are directly connected with the entering and outgoing liquid current they need not be electrically insulated. The disc 5 and the receiver 6 on the other hand must be electrically insulated because they are in direct conductive communication with the electrodes.

The liquid whose conductivity is to be measured is fed on to the disc 3 through the pipe 8. The liquid is divided into drops and flung against the wall of the receiver 6 whereafter it flows through the pipe 10, the heat-exchanger 13, the measuring cell 17 and subsequently to the vessel 15 and the pipe 9 and then onto the second disc 5.

The liquid drops flung outwards by the latter disc 5 are collected in the receiver 7 and carried off through the pipe 11.

Beside the measuring cell 17, there is the standard cell 22. Through the pipe 16, water of a constant temperature is passed through the jackets of the cells 22 and 17 and through the heat-exchanger 13. In this manner the temperature is maintained substantially equal. The liquid flows through the measuring cell 17 from the bottom upwards in order to avoid the occurrence of air pockets. The overflow of the vessel 15 has been located at the same level as the outlet of the receiver 6. In this manner the liquid is prevented from being siphoned out of the measuring cell 17.

The measuring cell proper 17 consists of a narrow part ending in two wider parts 18 and 19. In the two wider parts 18 and 19, the electrodes 20 and 21 respectively are housed. The ratio between the resistances in the cells 17 and 22 can be measured, for instance, with the Kohlrausch bridge, as has been schematically illustrated in the drawing. The Kohlrausch bridge has non-inductive fixed resistors 30 and 31. At the points 38 and 39, the bridge is fed by an alternating current which by a transformer 35, is supplied from the line 36 and is regulated by the resistor 33 and the current regulating tube 34. The voltage of the current supplied can be checked with the voltmeter 32. The measuring device 37 for reading or recording the conductivity is connected to the points 40 and 41.

The tension at these points may also be utilized for automatically governing a regulating device of the process to be controlled which influences the ion concentration in the liquid to be measured.

I claim:

1. An apparatus for continuously determining the electrical conductivity of a liquid comprising a measuring cell provided with feed- and discharge conduits for the liquid and provided with electrodes, means for measuring the electrical resistance between these electrodes and means to interrupt the bodily continuity of the liquid flow in the feed conduit, while maintaining the desired rate of flow through the measuring cell, comprising an element, adapted to rapidly rotate on a shaft, said element being located under the outlet of a feed pipe adapted to deliver liquid for the measuring cell near the centre of said element, said element being surrounded by a receiver the discharge pipe of which is connected with the inlet pipe of the measuring cell, said receiver being adapted to collect liquid flung outwards from said rotary element by the centrifugal force generated by the rotation of said element and means to rotate said element.

2. An apparatus for continuously determining the electrical conductivity of a liquid comprising a measuring cell provided with feed- and discharge conduits for the liquid and provided with electrodes, means for measuring the electrical resistance between these electrodes and means to interrupt the bodily continuity of the liquid flow in the discharge conduit, while maintaining the desired rate of flow through the measuring cell, comprising an element, adapted to rapidly rotate on a shaft, said element being located under the outlet of the discharge conduit of the measuring cell, this outlet being adapted to deliver liquid near the centre of the rotary element, said element being surrounded by a receiver provided with a discharge pipe, said receiver being adapted to collect liquid flung outwards from said rotary element by the centrifugal force generated by the rotation of said element and means to rotate said element.

3. An apparatus for continuously determining the electrical conductivity of a liquid comprising a measuring cell provided with feed- and discharge conduits for the liquid and provided with electrodes, means for measuring the electrical resistance between these electrodes and means to interrupt the bodily continuity of the liquid flow in the feed- and discharge conduits, while maintaining the desired rate of flow through the measuring cell, comprising two elements, each of which being adapted to rapidly rotate on a shaft, the first element being located under the outlet of a feed pipe adapted to deliver liquid for the measuring cell near the centre of that element, the second element being located under the outlet of the discharge conduit of the measuring cell, this outlet being adapted to deliver liquid near the centre of that second element, each rotary element being surrounded by a receiver, provided with a discharge pipe, the discharge pipe of the receiver surrounding the first element being connected with the feed conduit of the measuring cell, said receivers being adapted to collect liquid flung outwards from said rotary elements by the centrifugal force generated by the rotation of said elements and means to rotate said elements.

4. An apparatus for continuously determining the electrical conductivity of a liquid comprising a measuring cell provided with feed- and discharge conduits for the liquid and provided with electrodes, means for measuring the electrical resistance between these electrodes, and means to interrupt the bodily continuity of the liquid flow in the feed- and discharge conduits, while maintaining the desired rate of flow through the measuring cell, comprising two elements being adapted to rapidly rotate on a common shaft, the first element being located under the outlet of a feed pipe adapted to deliver liquid for the measuring cell near the centre of that element, the second element being located under the outlet of the discharge conduit of the measuring cell, this outlet being adapted to deliver liquid near the centre of that second element, each rotary element being surrounded by a receiver, provided with a discharge pipe, the discharge pipe of the receiver surrounding the first element being connected with the feed conduit of the measuring cell, said receivers, being adapted to collect liquid flung outwards from said rotary elements by the centrifugal force generated by the rotation of said elements and means to rotate said elements.

JOHANNES TERPSTRA.

REFERENCES CITED

The following references are of record in the file of this patent:

UNITED STATES PATENTS

| Number | Name | Date |
| --- | --- | --- |
| 2,370,609 | Wilson et al. | Feb. 27, 1945 |
| 2,547,440 | Clark et al. | Apr. 3, 1951 |
| 2,563,729 | Longsworth | Aug. 7, 1951 |